(12) United States Patent
Fujinaka

(10) Patent No.: US 11,754,909 B2
(45) Date of Patent: Sep. 12, 2023

(54) LENS DRIVE UNIT AND LENS BARREL COMPRISING SAME

(71) Applicant: Panasonic Intellectual Property Management Co., Ltd., Osaka (JP)

(72) Inventor: Hiroyasu Fujinaka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 272 days.

(21) Appl. No.: 17/229,949

(22) Filed: Apr. 14, 2021

(65) Prior Publication Data

US 2021/0333504 A1 Oct. 28, 2021

(30) Foreign Application Priority Data

Apr. 22, 2020 (JP) .................................. 2020-076268

(51) Int. Cl.
*G03B 3/10* (2021.01)
*G03B 5/02* (2021.01)

(52) U.S. Cl.
CPC .................. *G03B 3/10* (2013.01); *G03B 5/02* (2013.01); *G03B 2205/0053* (2013.01); *G03B 2205/0069* (2013.01)

(58) Field of Classification Search
CPC ..... G03B 3/10; G03B 5/04; G03B 2205/0053
See application file for complete search history.

(56) References Cited

U.S. PATENT DOCUMENTS

| 5,708,535 A | * | 1/1998 | Orimo | .................... G02B 7/102 359/822 |
| 6,968,129 B2 | | 11/2005 | Takei | |
| 2004/0234258 A1 | | 11/2004 | Takei | |

FOREIGN PATENT DOCUMENTS

| JP | S63-129848 A | 6/1988 |
| JP | H02-119564 A | 5/1990 |
| JP | H06-207945 A | 7/1994 |
| JP | H08-248290 A | 9/1996 |
| JP | H11273103 A | * 10/1999 |
| JP | 2004-317690 A | 11/2004 |
| JP | 3835429 B | 10/2006 |

OTHER PUBLICATIONS

JP,63-129548, A(1988) Machine Translation (Year: 1988).*

* cited by examiner

*Primary Examiner* — Minh Q Phan
(74) *Attorney, Agent, or Firm* — Renner, Otto, Boisselle & Sklar, LLP

(57) ABSTRACT

A lens drive unit 10 comprises permanent magnets 215a and 215b, a yoke 211, and a coil 210. The yoke 211 has center yoke portions 221a and 222a, a back yoke portion 231 and a connect yoke portion that magnetically joins the center yoke portions 221a and 222a and the back yoke portion 231. The coil 210 is wound so as to surround part of the center yoke portions 221a and 222a. The height of a surface of the center yoke portions facing the permanent magnets in an orthogonal direction to the optical axis direction is such that the height near the middle part in the optical axis direction is smaller than the height near the two ends in the optical axis direction.

9 Claims, 13 Drawing Sheets

LENS DRIVE UNIT AND LENS BARREL COMPRISING SAME

CROSS-REFERENCE TO RELATED APPLICATIONS

This application claims priority to Japanese Patent Application No. 2020-076268 filed on Apr. 22, 2020. The entire disclosure of Japanese Patent Application No. 2020-076268 is hereby incorporated herein by reference.

BACKGROUND

Technical Field

The present disclosure relates to, for example, a lens drive unit that drives a lens back and forth in the optical axis direction, and a lens barrel comprising this lens drive unit.

Description of the Related Art

A linear motor capable of high-speed response has been used conventionally to move the lens frame of a lens barrel in the optical axis direction (for example, Patent Literature 1).

The size of image sensors used in image pickup devices has been increasing in recent years for the purpose of increasing the number of pixels, improving the dynamic range, and so forth.

As the size of an image sensor increases, so does the size of the lens used in the lens barrel, and the mass of the lens also increases. Consequently, the actuator that drives the enlarged lens needs to have greater thrust than a conventional actuator.

For example, Patent Literature 1 discloses a configuration in which thrust is improved by providing a plurality of magnetic field portions to a single coil.

CITATION LIST

Patent Literature

Patent Literature 1: JP-A H8-248290

SUMMARY

Problem to be Solved by the Disclosure

However, the following problems are encountered with the above-mentioned conventional linear actuator.

That is, with the technology disclosed in Patent Literature 1, since the thrust tends to be low near the two ends of the center yoke, it may be difficult to drive the lens accurately to both ends of the center yoke.

Also, if the length of the center yoke in the lengthwise direction is increased in order to drive the ends accurately within the lens drive range, the required thrust will be obtained up to the end of the lens drive range, but the lens drive unit ends up being larger in size, so the lens barrel cannot be made more compact.

The present disclosure provides a lens drive unit that affords a smaller size and is capable of driving a lens by obtaining the necessary thrust up to an end portion in the driving range of the lens, as well as a lens barrel comprising this lens drive unit.

Means for Solving Problem

The lens drive unit disclosed herein drives a lens back and forth in the optical axis direction, the lens drive unit includes two permanent magnets, a yoke, and a coil. The two permanent magnets are spaced apart and substantially parallel, with the same poles facing each other. The yoke has center yoke portions provided in the space where the two permanent magnets are facing each other, a back yoke portion provided at a position in contact with a surface on the opposite side from the facing poles of the permanent magnets, and a connect yoke portion that magnetically joins the center yoke portions and the back yoke portion. The coil is wound so as to surround a part of the center yoke portions. The height of the surface of the center yoke portions facing the permanent magnets in an orthogonal direction to the optical axis direction is such that the height near the middle part in the optical axis direction is smaller than the height near the two ends in the optical axis direction.

The lens drive unit disclosed herein is also a lens drive unit that drives a lens back and forth in the optical axis direction, and includes two permanent magnets, a yoke, and a coil. The two permanent magnets that are spaced apart and substantially parallel, with the same poles facing each other. The yoke has center yoke portions provided in the space where the two permanent magnets are facing each other, a back yoke portion provided at a position in contact with a surface on the opposite side from the facing poles of the permanent magnets, and a connect yoke portion that magnetically joins the center yoke portions and the back yoke portion. The coil is wound so as to surround a part of the center yoke portions. The gap between the opposing surfaces of the center yoke portions and the permanent magnets is such that the gap near the middle part in the optical axis direction is larger than the gap near the two ends in the optical axis direction.

Advantageous Effects

With the lens drive unit disclosed herein, it is possible to obtain the necessary thrust to drive the lens up to the end of the drive range of the lens, while still achieving a compact size.

DETAILED DESCRIPTION OF THE PREFERRED EMBODIMENTS

Embodiments will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art. Also, in the following description of embodiments, expressions indicating relative direction or orientation are used, such as parallel, vertical, and perpendicular, but these expressions encompass situations that do not, strictly speaking, refer to a direction or orientation. For instance, "parallel" means not only perfectly parallel, but also substantially parallel, that is, the meaning includes a difference of a few percent, for example.

The inventor has provided the appended drawings and the following description so that a person skilled in the art might fully understand this disclosure, but does not intend for these to limit what is discussed in the patent claims.

Embodiment 1

The lens drive unit according to an embodiment of the present disclosure, and the lens barrel 100 provided with this lens drive unit will now be described with reference to FIGS. 1 to 8B.

(1) Overview of Configuration of Lens Barrel 100

Figure 1:
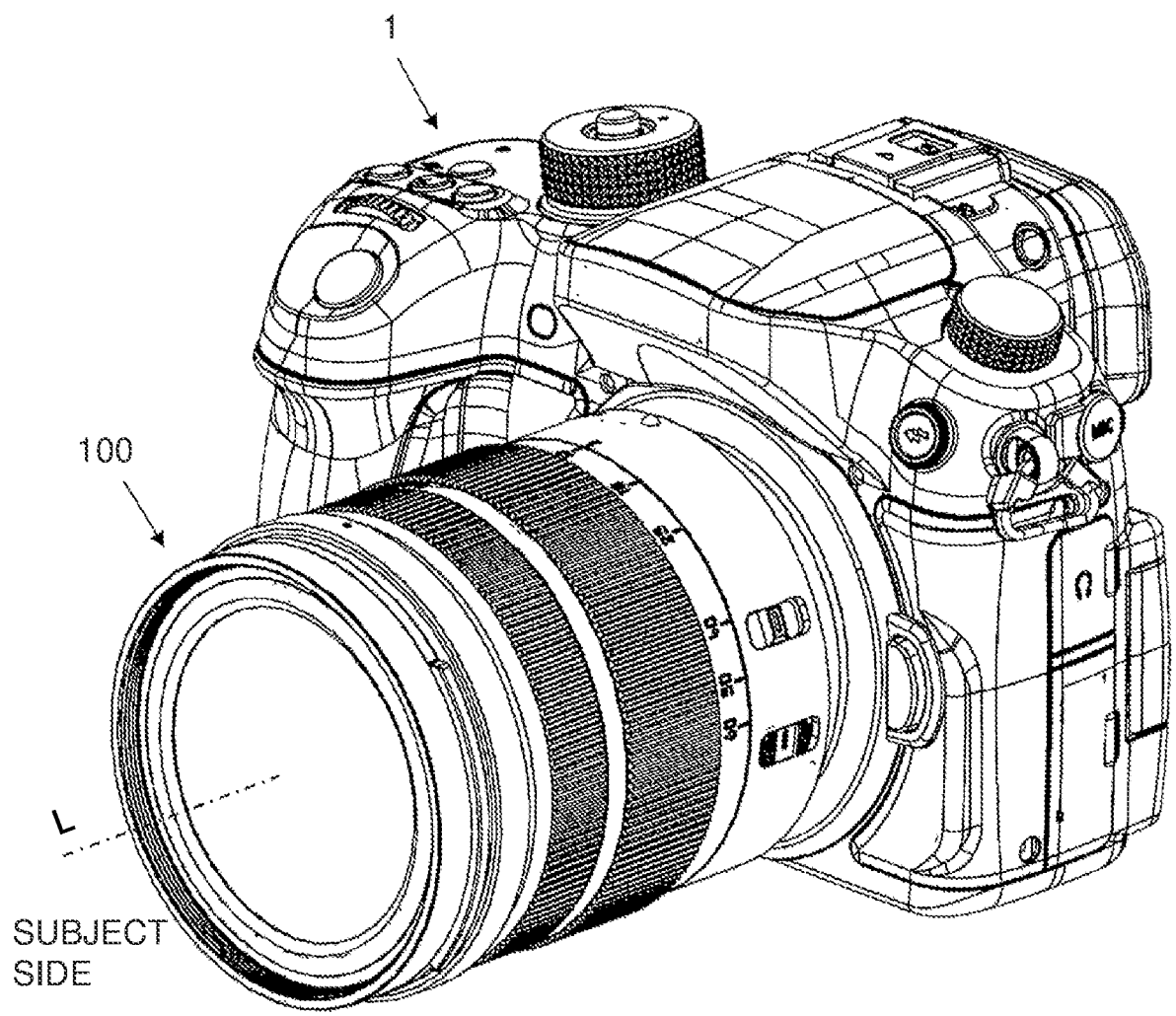
FIG. 1 is an oblique view showing a camera equipped with a lens barrel according to Embodiment 1.
Figure 2:
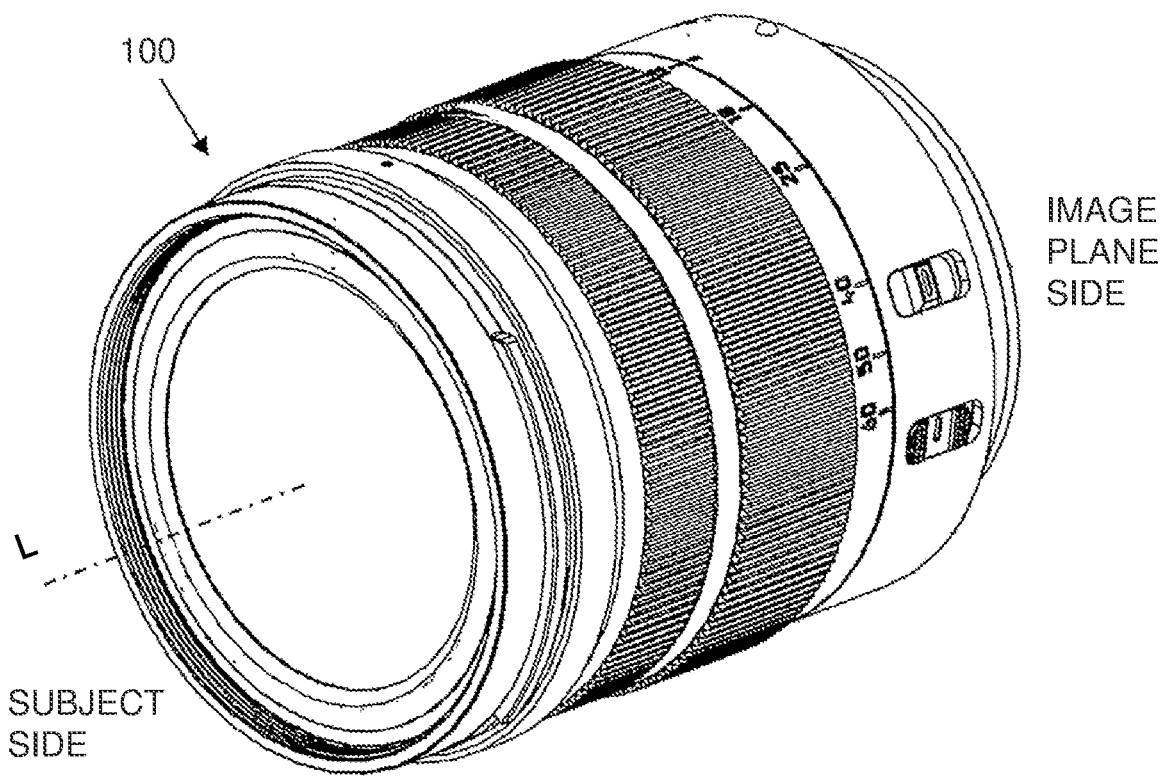
FIG. 2 is an oblique view showing the lens barrel of FIG. 1.
Figure 3:
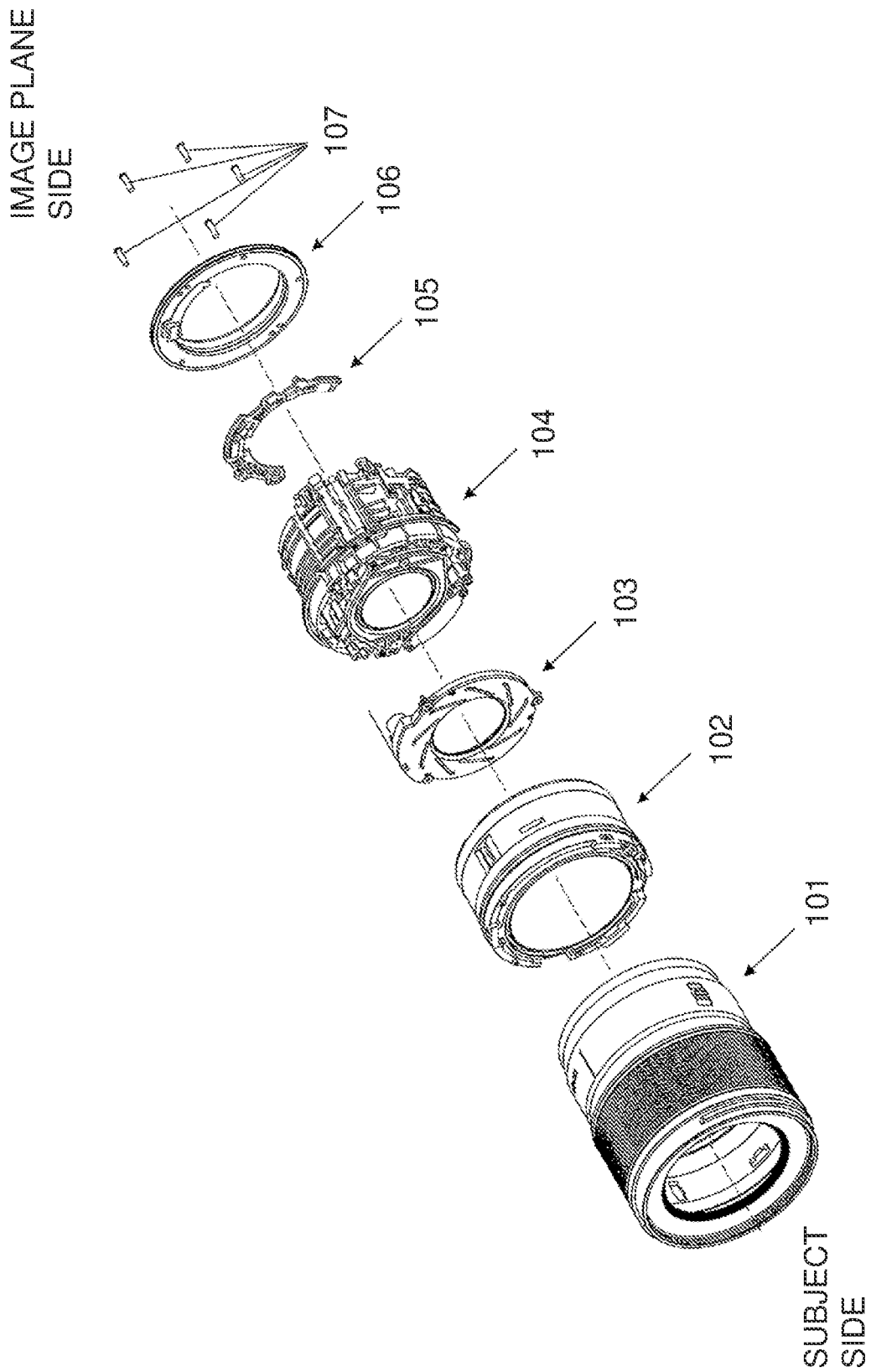
FIG. 3 is an exploded oblique view of the lens barrel of FIG. 2.

The configuration of the lens barrel 100 according to this embodiment will now be described with reference to the drawings. FIG. 1 is an oblique view showing the state in which the lens barrel 100 according to this embodiment is attached to a camera body 1. FIG. 2 is an oblique view showing an overview of the configuration of the lens barrel 100 according to this embodiment. FIG. 3 is an exploded oblique view of the lens barrel 100 according to this embodiment.

The lens barrel 100 is a retractable lens barrel, and is detachably attached to the camera body 1 as shown in FIGS. 1 and 2. As shown in FIG. 3, the lens barrel 100 comprises an exterior unit 101, a first lens group unit 102, a diaphragm unit 103, a second and third lens group unit 104, a substrate unit 105, a lens mount 106, and a screw 107.

The lens barrel 100 is attached to the camera body 1 via the lens mount 106 in a state in which the components from the exterior unit 101 to the substrate unit 105 have been assembled.

The exterior unit 101 is a substantially cylindrical member that covers the outer periphery of the lens barrel 100, and is disposed closest to the subject.

The first lens group unit 102 is a substantially cylindrical member, includes a first lens group, and is disposed on the inner peripheral surface side of the exterior unit 101.

The diaphragm unit 103 is a substantially annular member, and is provided between the first lens group unit 102 and the second and third lens group unit 104 in order to adjust the amount of light transmitted through the lens portion of the lens barrel 100 by driving movable blades to vary the surface area of the opening portion.

The second and third lens group unit 104 is a substantially cylindrical member that holds a second lens group and a third lens group, and comprises a lens drive unit 10 for driving a focus lens (discussed below) back and forth in the optical axis direction. The second and third lens group unit 104 is disposed on the inner peripheral surface side of the exterior unit 101.

The substrate unit 105 is a unit for driving the lens barrel 100, and includes a printed circuit board on which electrical components, electrical contacts, and the like are mounted. The substrate unit 105 is attached to the image plane side of the second and third lens group unit 104.

The lens mount 106 is a connecting-use constituent member for connecting and fixing the lens barrel 100 to the camera body 1, which is fixed on the image plane side of the second and third lens group unit 104 together with the substrate unit 105, with a plurality of screws 107.

(2) Second and Third Lens Group Unit

Next, the configuration of the second and third lens group unit 104 will be described in detail.

(2-1) Overall Configuration

First, the overall configuration of the second and third lens group unit 104 according to this embodiment will be described.

Figure 4:
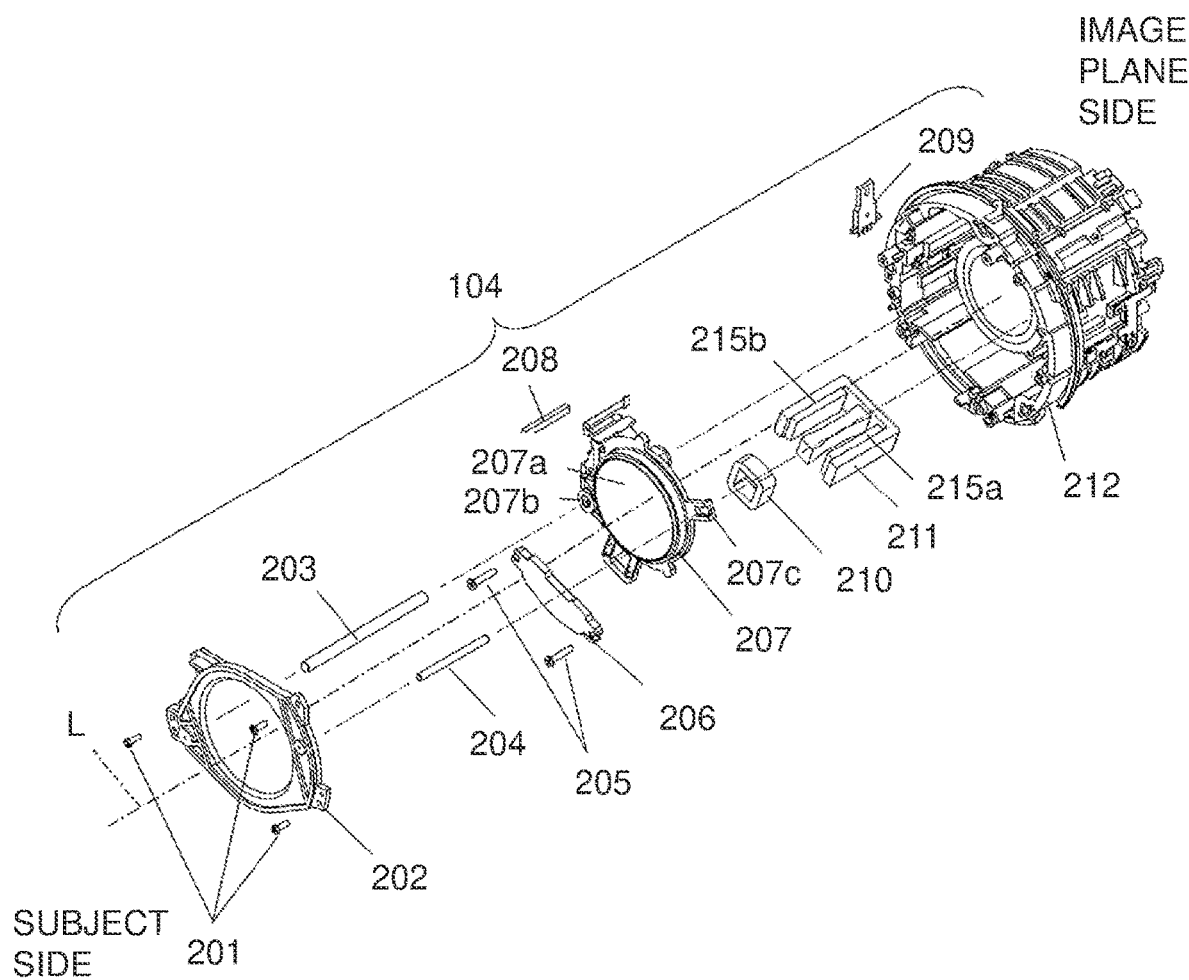
FIG. 4 is an exploded oblique view of a second and third lens group unit included in the lens barrel of FIG. 3.

FIG. 4 is an exploded oblique view of the second and third lens group unit 104. As shown in FIG. 4, the second and third lens group unit 104 comprises a shaft holding frame 202, a main shaft 203, a sub-shaft 204, a sub-yoke 206, a focus lens unit 207, an MR (magnetoresistive) magnet 208, a coil 210, a yoke 211, an MR (magnetoresistive) sensor 209, and a base frame 212, which are provided in that order, from the subject side toward the image plane side.

The shaft holding frame 202 is a substantially annular member disposed closest to the subject side of the second and third lens group unit 104, and holds the end portions of the main shaft 203 and the sub-shaft 204 on the subject side. The shaft holding frame 202 is fixed to the base frame 212 with a plurality of screws 201.

The main shaft 203 and the sub-shaft 204 are inserted into insertion holes 207b and 207c of the focus lens unit 207, respectively, and are disposed in the direction of the optical axis L. The main shaft 203 and the sub-shaft 204 guide the movement of the focus lens unit 207 in the direction of the optical axis L. Also, the ends of the main shaft 203 and the sub-shaft 204 on the image plane side are fixed to the base frame 212.

Consequently, the focus lens unit 207 is driven in the direction of the optical axis L along the main shaft 203 while rotation around the main shaft 203 is restricted by the sub-shaft 204.

The sub-yoke 206 is a member constituting the lens drive unit 10 (discussed below), and is fixed to the substantially E-shaped yoke 211. More specifically, the sub-yoke 206 is fixed to the base frame 212 together with the yoke 211 with two screws 205.

The focus lens unit 207 is an autofocus lens unit that is driven back and forth in the direction of the optical axis L by the lens drive unit 10 (discussed below), and holds a focus lens 207a.

The MR magnet 208 is an example of a position sensing member that senses the position of the focus lens unit 207, and is fixed to the focus lens unit 207.

The MR sensor 209 is an example of a position sensing sensor, and is fixed to the base frame 212.

The MR magnet 208 is provided to the focus lens unit 207 so as to be disposed near the MR sensor 209 in an assembled state. Therefore, when the focus lens unit 207, including the MR magnet 208, moves back and forth in the direction of the optical axis L, the MR sensor 209 detects a change in the magnetic field caused by a change in the relative position of the MR magnet 208 with respect to the MR sensor 209.

Consequently, the shift position of the focus lens unit 207 with respect to the base frame 212 can be sensed by sensing the output of the MR sensor 209.

In this embodiment, an MR sensor is used as an example of a position sensor, but another position sensor such as a photocoupler may be used instead, for example.

Also, in this embodiment, an MR magnet is used as an example of a position sensing member, but another position sensing member such as a reflection mirror may be used instead, for example.

The coil 210 is a member constituting the lens drive unit 10 (discussed below), and is fixed to the focus lens unit 207, and the center yoke portions 221a and 222a of the substantially E-shaped yoke 211 are inserted therein.

The yoke 211 is a substantially E-shaped member, and the sub-yoke 206 is fixed to the open side of this E shape.

The configuration of the lens drive unit 10, including the sub-yoke 206, the coil 210, the yoke 211, and the like, will be described in detail below.

The base frame 212 is a substantially cylindrical member disposed on the side of the second and third lens group unit 104 closest to the image plane, and the focus lens unit 207 is housed on the substantially cylindrical inner peripheral surface side in a state of being capable of moving in the direction of the optical axis L.

(2-2) Configuration of Lens Drive Unit 10

Next, the configuration of the lens drive unit 10 according to this embodiment will be described.

The lens drive unit 10 is a device that drives the focus lens unit (lens frame) 207 back and forth in the direction of the optical axis L.

Figure 5A:
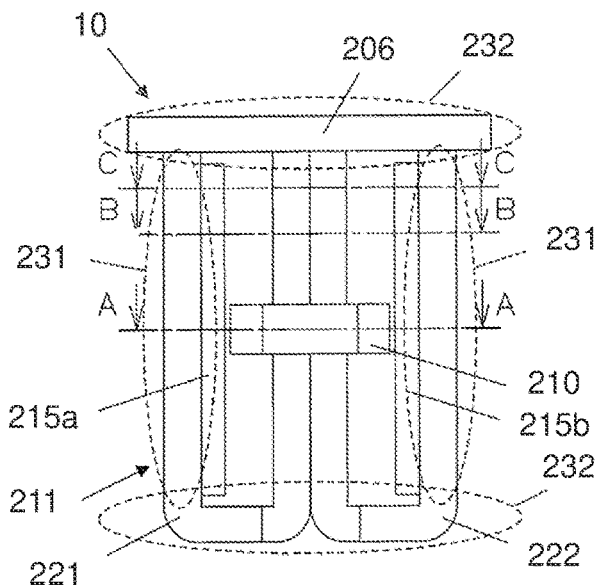
FIG. 5A is a plan view showing the configuration of a lens drive unit included in the second and third lens group unit of FIG. 4.

As shown in FIG. 5A, etc., the lens drive unit 10 has a substantially E-shaped yoke 211, a pair of permanent magnets 215a and 215b fixed inside the substantially E-shaped yoke 211, a sub-yoke (third yoke) 206 fixed so as to cover the open side of the approximate E shape of the yoke 211, and a coil 210.

As shown in FIG. 6A, the yoke 211 is configured such that a substantially U-shaped yoke member (first yoke) 221 and a yoke member (second yoke) 222 having a shape that is in mirror symmetry with the yoke member 221 are combined into an approximate E shape.

The portions where the two yoke members 221 and 222 are connected to each other are used as the center yoke portions 221a and 222a.

In this embodiment, the focus lens unit 207 is driven by a single lens drive unit 10.

In the following, for the sake of convenience, just the configuration of the lens drive unit 10, out from the configuration in FIG. 4, will be focused on for description.

Figure 5B:
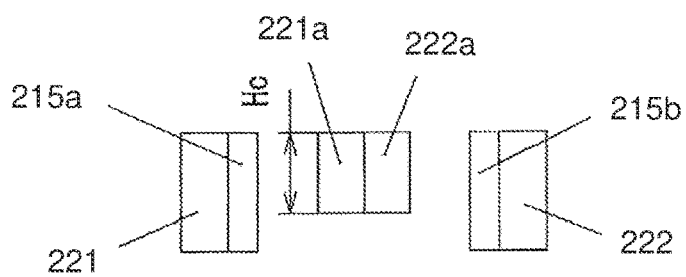
FIG. 5B is a cross-sectional view along the C-C line in FIG. 5A.
Figure 5C:
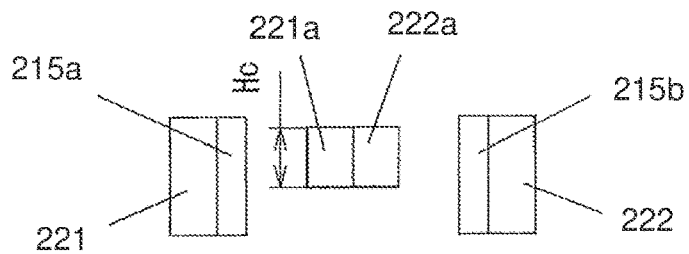
FIG. 5C is a cross-sectional view along the B-B line in FIG. 5A.
Figure 5D:
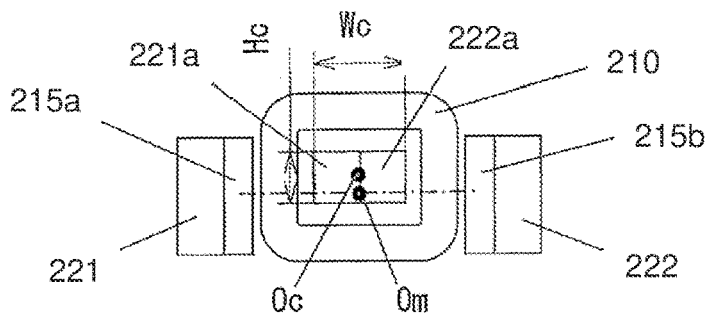
FIG. 5D is a cross-sectional view along the A-A line in FIG. 5A.
Figure 6:
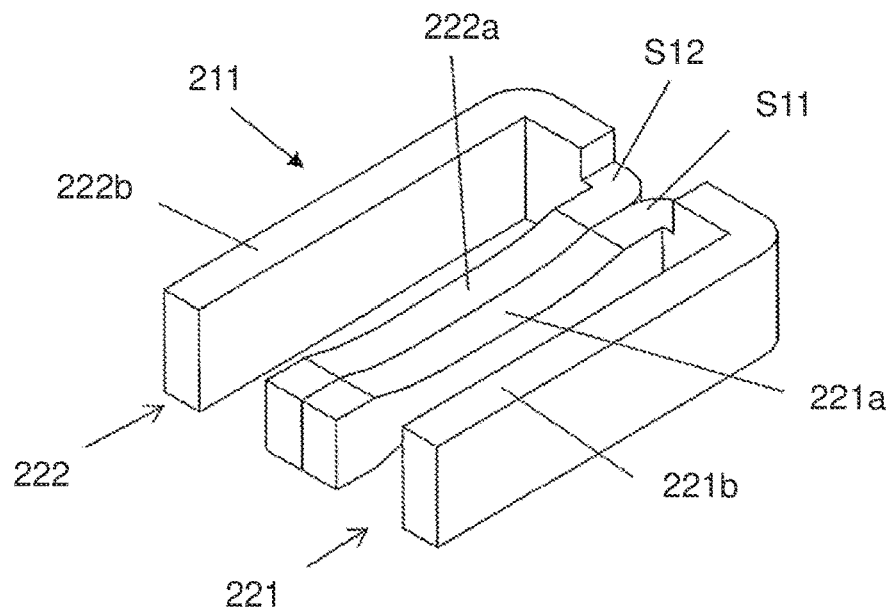
FIG. 6 is an oblique view showing the configuration of a yoke included in the lens drive unit of FIG. 5A.
Figure 7:
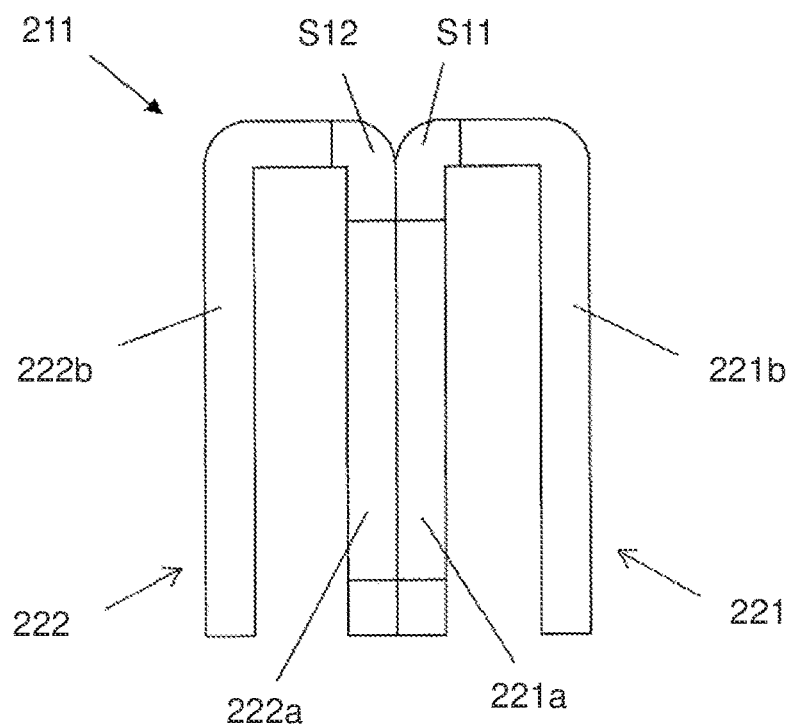
FIG. 7 is a plan view of the yoke of FIG. 6.

FIG. 5A is a plan view showing the configuration of the lens drive unit 10 according to this embodiment. FIG. 5B is a cross-sectional view along the C-C line in FIG. 5A, FIG. 5C is a cross-sectional view along B-B line in FIG. 5A, and FIG. 5D is a cross-sectional view along the A-A line in FIG. 5A. FIGS. 6 and 7 are an oblique view and a plan view showing the yoke 211 constituting the lens drive unit 10 in this embodiment.

Figure 8A:
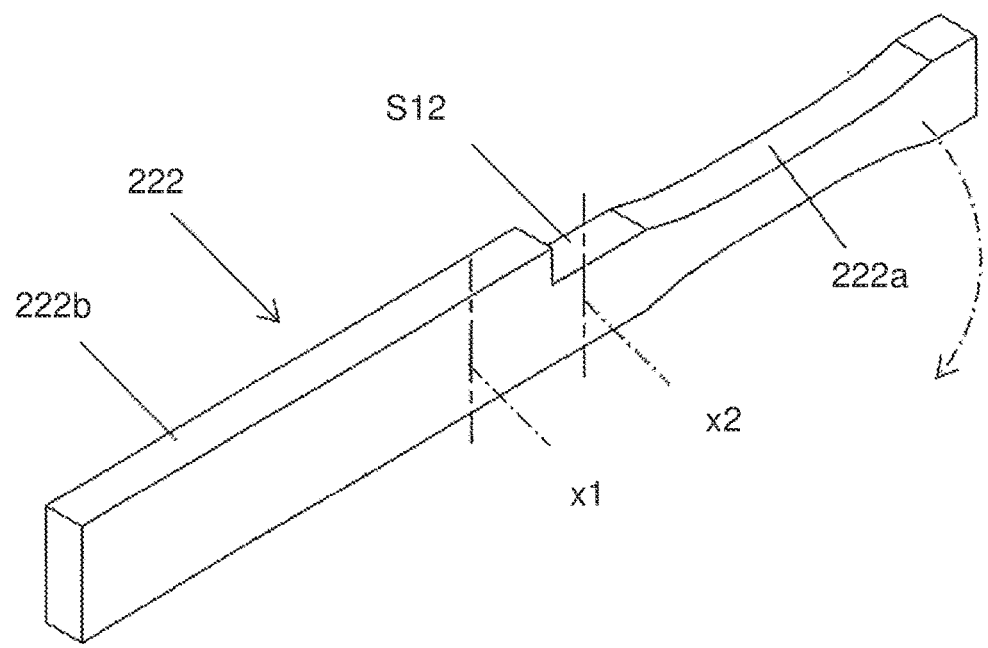
FIG. 8A is an oblique view showing the state prior to working the yoke member constituting the yoke of FIG. 6.

The yoke member 221, the yoke member 222, and the sub-yoke 206 are produced by shaping a sheet of iron by stamping. The yoke members 221 and 222 are formed as follows. As shown in FIG. 8A, for example, the flat yoke member 222 is bent at two bending portions x1 and x2 in the same direction to form the substantially U-shaped yoke member 222 shown in FIG. 8B.

Also, recesses formed in vertical symmetry are formed in the center yoke portions 221a and 222a of the yoke members 221 and 222.

Figure 8B:
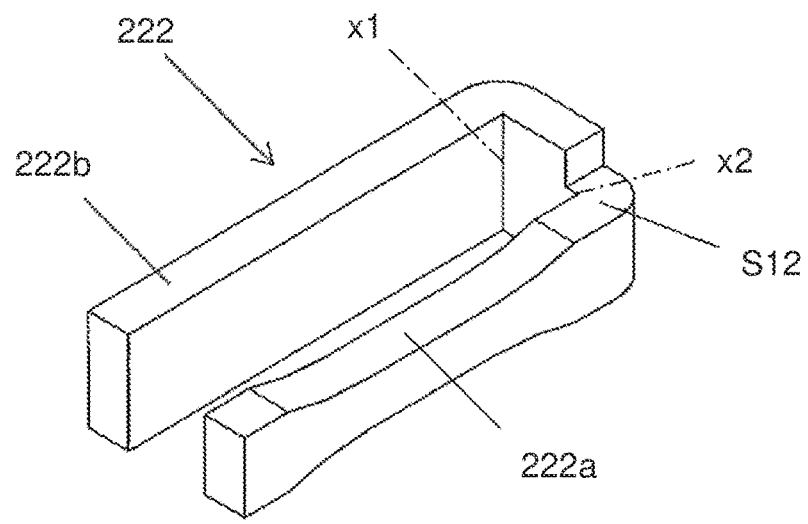
FIG. 8B is an oblique view showing the state after working the yoke member of FIG. 8A.

Although the yoke member 222 was described as illustrated in FIGS. 8A and 8B for the sake of convenience, the yoke member 221 is also formed in the same shape so as to be in left and right symmetry with the yoke member 222.

Then, the side surfaces of the center yoke portions 221a and 222a are connected so that the two yoke members 221 and 222 are in left and right symmetry, thereby configuring a substantially E-shaped yoke.

As described above, the yoke 211 can be produced by a very simple process of connecting the two substantially U-shaped yoke members 221 and 222 produced by bending a sheet metal-shaped member, and this is advantageous in terms of the productivity of the yoke 211.

The permanent magnets 215a and 215b are neodymium-based sintered magnets, are magnetized so that the sides in contact with the yoke members 221 and 222 shown in FIG. 5A are the S pole and the opposite sides are the N pole, and are fixed to the yoke members 221 and 222. Neodymium-based sintered magnets are generally produced by the compression molding of a magnetic powder in a magnetic field, and then sintering this product at a high temperature. Since the process of forming a neodymium-based sintered magnet is a special process involving compression molding in a magnetic field, very large-scale equipment is required, and from the standpoint of productivity and cost, usually a magnet in the form of an extremely large block is produced, after which magnets having a required shape are cut out from this large magnetic block. When cutting out a magnet, the simplest process is to simply cut the magnet, and the yield of magnets is also higher.

The permanent magnets 215a and 215b can be formed just by cutting if they are formed into a cuboid shape as shown in FIGS. 5A to 5D, and this is advantageous in terms of cost, material yield, and so forth.

The yoke member 221 and the yoke member 222 are fixed so that their side surfaces to which the permanent magnets 215a and 215b are not fixed come into contact with each other.

The coil 210 is wound so as to cover a part of the center yoke portions 221a and 222a in which the yoke member 221 and the yoke member 222 are in contact with each other and the permanent magnets 215a and 215b are not fixed.

The sub-yoke 206 is fixed to the substantially U-shaped open portions of the yoke member 221 and the yoke member 222. The role of the sub-yoke 206 is to close off the open portions of the substantially E-shaped yoke 211 (the yoke member 221 and the yoke member 222), and to magnetically couple the yoke member 221 and the yoke member 222.

Here, when current is applied to the coil 210, the coil 210 receives a Lorentz force and is driven in the direction of the optical axis L.

More precisely, since the permanent magnets 215a and 215b are fixed to the base frame 212 side and the coil 210 is fixed to the focus lens unit 207 side, the focus lens unit 207 is driven in the direction of the optical axis L with respect to the base frame 212 when the coil 210 is energized.

With the lens drive unit 10 in this embodiment, as shown in FIGS. 5B to 5D, the surface area of the facing surfaces of the center yoke portions 221a and 222a disposed opposite the permanent magnets 215a and 215b is configured such that the surface area near the middle part in the lengthwise direction is smaller than the surface area near the two ends in the lengthwise direction.

That is, the surface area of the facing surface of the center yoke portions 221a and 222a disposed opposite the permanent magnets 215a and 215b is, in decreasing order, as shown in FIG. 5B, which is a cross-sectional view of one end in the lengthwise direction, as shown in FIG. 5C, which is a cross-sectional view in between FIGS. 5B and 5D, and as shown in FIG. 5D, which is a cross-sectional view of the vicinity of the middle part in the lengthwise direction.

More specifically, the width We of the center yoke portions 221a and 222a shown in FIGS. 5B to 5D is constant, and the height Hc decreases in the order of FIGS. 5B, 5C, and 5D.

Therefore, the surface area of the center yoke portions 221a and 222a opposite the permanent magnets 215a and 215b becomes smaller in the order of FIGS. 5B, 5C, and 5D.

This is because, as shown in FIGS. 6 and 7, vertically symmetrical recesses are formed from the two ends in the lengthwise direction of the center yoke portions 221a and 222a of the two yoke members 221 and 222 toward the central portion.

That is, the height of the center yoke portions 221a and 222a is lowered by steps S11 and S12 from the main bodies 221b and 222b of the yoke members 221 and 222 via the bent portions x1 and x2. The center yoke portions 221a and 222a are configured such that the height Hc decreases from the portions of the steps S11 and S12 toward the center in the lengthwise direction. Consequently, the surface area near the two ends of the center yoke portions 221a and 222a opposite the permanent magnets 215a and 215b is larger than that near the middle part, so the effect of a decrease in the effective magnetic flux density near both ends of the center yoke portions 221a and 222a is canceled out, and the thrust can be prevented from decreasing.

Consequently, the focus lens unit 207 can be accurately driven up to both ends of the center yoke portions 221a and 222a.

Here, with the lens drive unit 10 in this embodiment, as shown in FIG. 5D, the center Oc of the coil 210 is provided at a position that is offset from the center Om of the two permanent magnets 215a and 215b.

That is, as shown in FIG. 5A, etc., the lens drive unit 10 in this embodiment comprises the two permanent magnets 215a and 215b, the yoke 211 (yoke members 221 and 222), the sub-yoke 206, and the coil 210.

The two permanent magnets 215a and 215b are disposed spaced apart and substantially parallel to each other, with the same poles facing each other. The two permanent magnets 215a and 215b need not be disposed substantially parallel to each other.

As shown in FIG. 5A, the yoke members 221 and 222 and the sub-yoke 206 have the center yoke portions 221a and 222a provided in the space where the two permanent magnets 215a and 215b are facing each other, a back yoke portion 231 provided at a position in contact with a surface on the opposite side from the facing poles of the permanent magnets 215a and 215b, and a connect yoke portion 232 that magnetically joins the center yoke portions 221a and 222a and the back yoke portion 231.

As described above, with the lens drive unit 10 in this embodiment, the center Oc of the coil 210 is provided offset from the center Om of the two permanent magnets 215a and 215b, and the coil 210 is installed so as to be offset to the outer peripheral side of a circle centered on the optical axis L of the lens.

Consequently, a larger lens drive unit 10 can be disposed, which means that the performance can be improved, such as increasing the driving force of the lens drive unit 10.

On the other hand, when the lens drive unit 10 is configured to have the same performance as a conventional configuration, that is, to have permanent magnets 215a and 215b and a coil 210 of substantially the same size, the center Oc of the coil 210 is disposed so as to be offset to the center Om of the two permanent magnets, so the lens drive unit 10 can be easily accommodated in a substantially cylindrical lens barrel 100, so the outside diameter of the lens barrel 100 can be reduced.

Comparative Example 1

Here, the configuration of a lens drive unit 500 according to Comparative Example 1 will be described in order to compare its performance with that of the lens drive unit 10 of Embodiment 1 described above, as shown in FIGS. 9A and 9B.

That is, the lens drive unit 500 of Comparative Example 1 differs from the lens drive unit 10 of Embodiment 1 in that the surface area of the center yoke portions 521a and 522a opposite the permanent magnets 515a and 515b is the same near the middle part and at the two ends in the lengthwise direction.

Figure 9A:
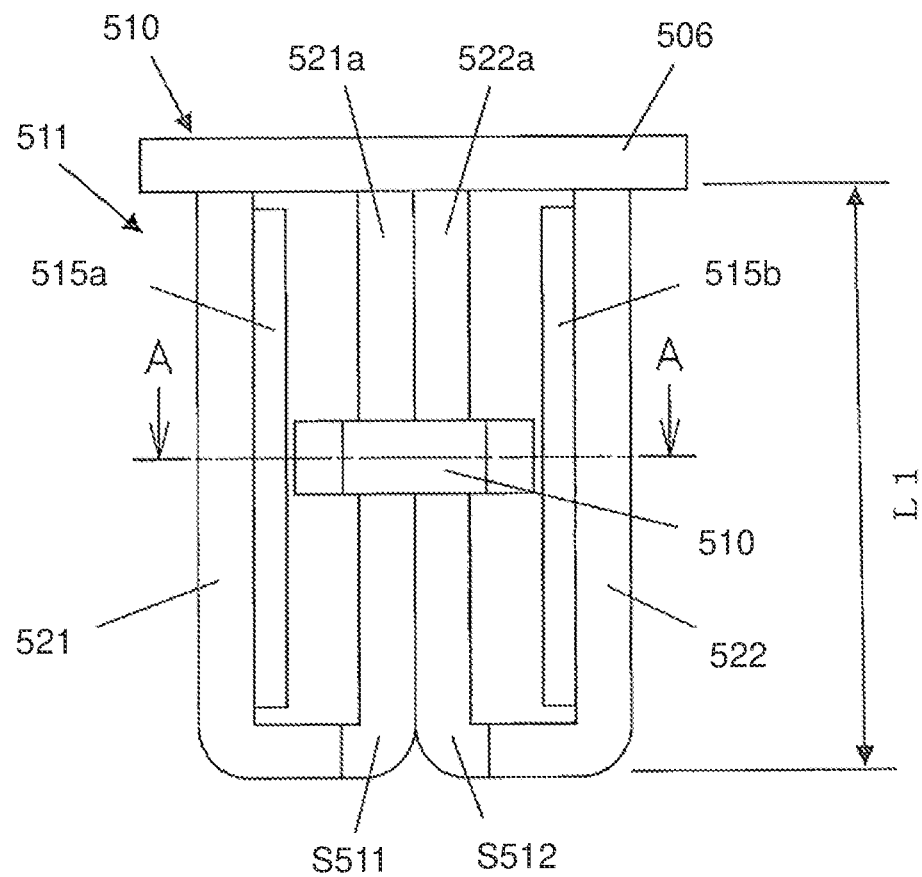
FIG. 9A is a plan view showing the configuration of a lens drive unit according to Comparative Example 1.

As shown in FIG. 9A, the lens drive unit 500 has a substantially E-shaped yoke 511, a pair of permanent magnets 515a and 515b fixed inside the substantially E-shaped yoke 511, a sub-yoke 506 fixed so as to cover the open side of the approximate E shape of the yoke 511, and a coil 510.

As shown in FIG. 9A, the yoke 511 is configured such that a substantially U-shaped yoke member 521 is combined with a yoke member 522 having a shape in mirror symmetry with the yoke member 521, producing an approximate E shape.

The portions connecting the two yoke members 521 and 522 to each other are used as the center yoke portions 521a and 522a.

Figure 9B:
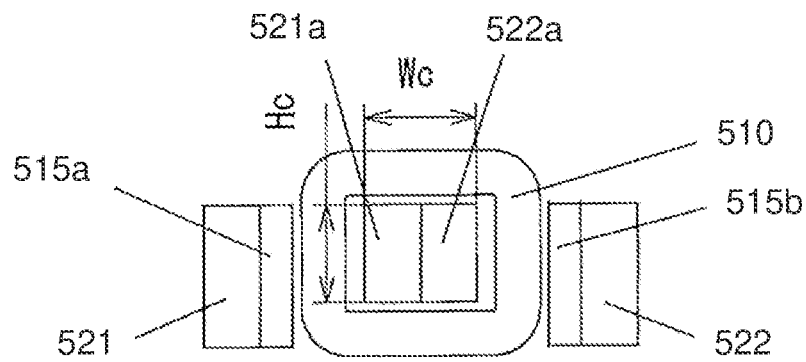
FIG. 9B is a cross-sectional view along the A-A line in FIG. 9A.

In Comparative Example 1, as shown in FIG. 9B, the surface area of the center yoke portions 521a and 522a near the middle part in the lengthwise direction opposite the permanent magnets 515a and 515b is substantially the same as the surface area at the two ends.

Comparative Example 2

Next, the configuration of a lens drive unit 600 according to Comparative Example 2 will be described in order to compare its performance with that of the lens drive unit 10 of Embodiment 1 described above, as shown in FIGS. 10 and 10B.

That is, the lens drive unit 600 of Comparative Example 2 differs from the lens drive unit 500 of Comparative Example 1 in that the center yoke portions 621a and 622a are longer in the lengthwise direction, but otherwise the two are the same.

Figure 10A:
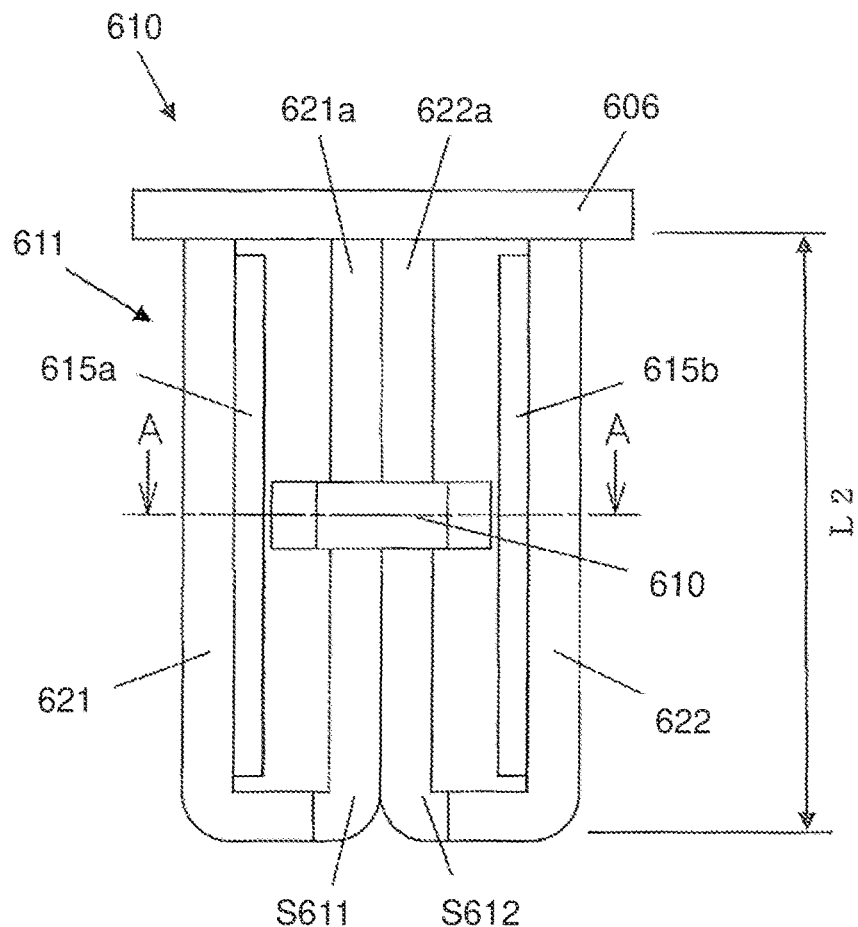
FIG. 10A is a plan view showing the configuration of a lens drive unit according to Comparative Example 2.

As shown in FIG. 10A, the lens drive unit 600 has a substantially E-shaped yoke 611, a pair of permanent magnets 615a and 615b fixed inside the substantially E-shaped yoke 611, a sub-yoke 606 fixed so as to cover the open side of the approximate E shape of the yoke 611, and a coil 610.

As shown in FIG. 10A, the yoke 611 is configured such that a substantially U-shaped yoke member 621 is combined with a yoke member 622 having a shape in mirror symmetry with the yoke member 621, producing an approximate E shape.

The portions connecting the two yoke members 621 and 622 to each other are used as the center yoke portions 621a and 622a.

Figure 10B:
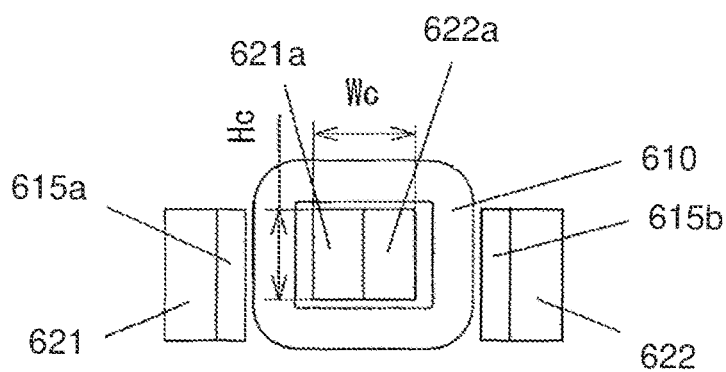
FIG. 10B is a cross-sectional view along the A-A line in FIG. 10A.

In Comparative Example 2, as shown in FIG. 10B, just as in Comparative Example 1, the surface area near the middle part of the center yoke portions 621a and 622a in the lengthwise direction opposite the permanent magnets 615a and 615b is approximately the same as the surface area at the two ends.

The length L2 of the center yoke portions 621a and 621b in the lengthwise direction is greater than the length L1 of the center yoke portions 521a and 521b in Comparative Example 1. Comparison Results Here, we will discuss the comparison results when using the lens drive unit 10 of Embodiment 1, the lens drive unit 500 of Comparative Example 1, and the lens drive unit 600 of Comparative Example 2 described above, by using the graph of FIG. 11, which shows the relation between the position of the coil with respect to the center yoke portion, and the change in thrust.

Figure 11:
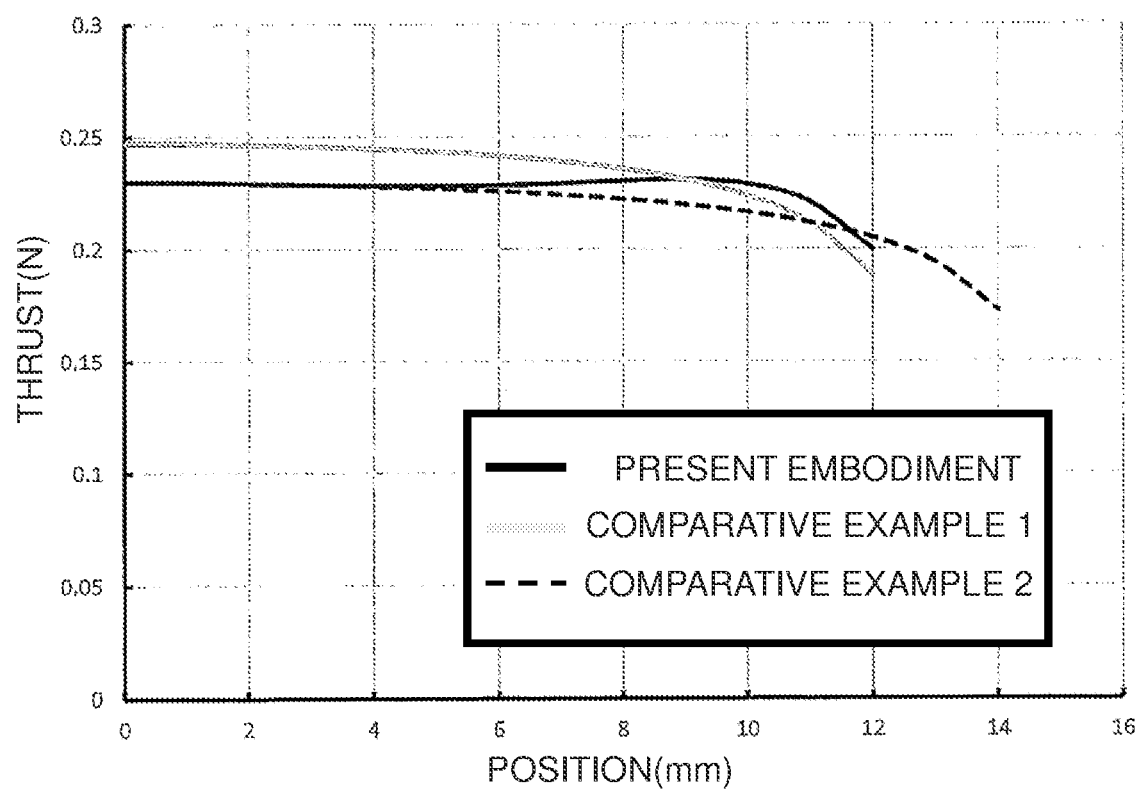
FIG. 11 is a graph showing the relation between thrust and the position of the coil of the lens drive unit according to this embodiment, the lens drive unit according to Comparative Example 1 in FIG. 9A, and the lens drive unit according to Comparative Example in of FIG. 10A.

In the graph shown in FIG. 11, the horizontal axis is the position of the coil with respect to the center yoke portion (the 0 side means the center of the center yoke portion), and the vertical axis is the amount of thrust (N) generated when the coil is energized.

With the configuration of the lens drive unit 10 in Embodiment 1, as shown in FIG. 11, it can be seen that when the coil moves from the center to the end of the center yoke portion, from 0 to about 11 mm the coil moves under a thrust of about 0.23 N, and the thrust decreases slightly at a position of 12 mm at the very end.

With the configuration of the lens drive unit 500 in Comparative Example 1 shown in FIG. 9A, etc., as shown in FIG. 11, it can be seen that when the coil moves from the center to the end of the center yoke portion, from 0 to about 6 mm the coil moves under thrust of about 0.25 to 0.24 N, but the thrust gradually decreases in movement from the 6 mm position to the end side, and greatly decreases to about 0.18 N by the 12 mm position.

That is, it can be seen that with the configuration of Comparative Example 1, the thrust when moving to the end portion side is far lower than that near the middle part as compared with the configuration of Embodiment 1.

With the configuration of the lens drive unit 600 in Comparative Example 2 shown in FIG. 10A, etc., as shown in FIG. 11, even if the length of the center yoke portion is increased in order to obtain the same thrust as with the configuration of Embodiment 1 up to the position of the 12-mm portion of the end of the center yoke portion, it can be seen that when the coil moves from the center to the end of the center yoke portion, the thrust remains at about 0.23 N from 0 mm to about 6 mm, and the thrust gradually decreases moving from the 6-mm position to the end side, then greatly decreases to about 0.21 N at the 12-mm position, and decreases to 0.17 N at the 14-mm position at the end.

That is, with the configuration in Comparative Example 2, when an attempt is made to obtain thrust equivalent to that with the configuration in Embodiment 1 at a position of 12 mm, it can be seen that the size of the center yoke portion in the lengthwise direction increases, and the thrust after a move to the end side is already reduced from that at a position closer to the center as compared with Embodiment 1.

As a result of the above, it was found that with the configurations of Comparative Examples 1 and 2, it is difficult to obtain the same thrust maintaining effect as that of the lens drive unit 10 in this embodiment from near the middle part to the end of the center yoke portion.

Also, it was found that the size of the center yoke portion of the lens drive unit in the lengthwise direction increases in order to obtain the same thrust as with the lens drive unit 10 of this embodiment at the end of the center yoke portion.

As a result, with the lens drive unit 10 of this embodiment, it is possible to minimize the decrease in thrust near the ends of the center yoke portions 221a and 222a and to drive the focus lens unit 207 with a greater stroke. Furthermore, the size of the lens drive unit 10 in the drive direction can be reduced.

Embodiment 2

The configuration of the lens drive unit 300 according to another embodiment of the present disclosure will now be described with reference to FIGS. 12A to 14.

Figure 12A:
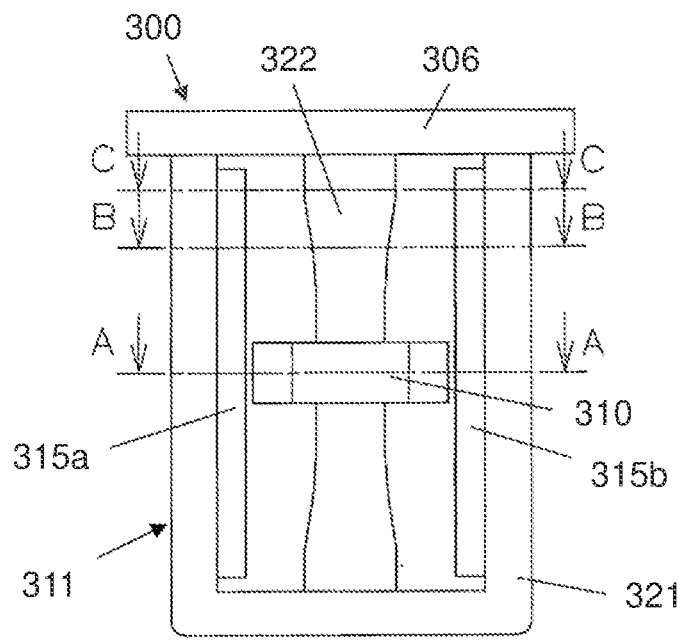
FIG. 12A is a plan view showing the configuration of a lens drive unit according to another embodiment of the present disclosure.

As shown in FIG. 12A, the lens drive unit 300 of this embodiment has a substantially E-shaped yoke 311, a pair of permanent magnets 315a and 315b fixed on the inside of the substantially E-shaped yoke 311, a sub-yoke 306 fixed so as to cover the open side of the substantially E-shape of 311, and a coil 310.

Figure 13A:
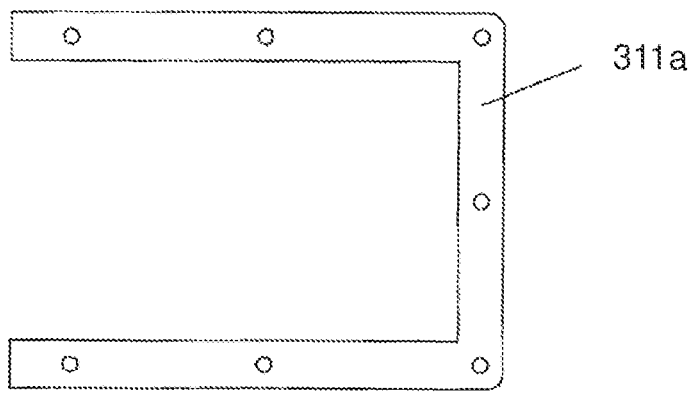
FIG. 13A is a plan view showing a yoke member constituting the yoke in FIG. 12A.
Figure 13B:
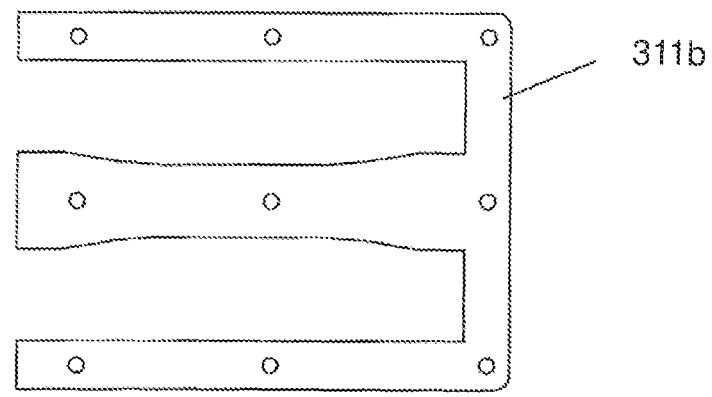
FIG. 13B is a plan view showing another yoke member constituting the yoke in FIG. 12A.
Figure 13C:
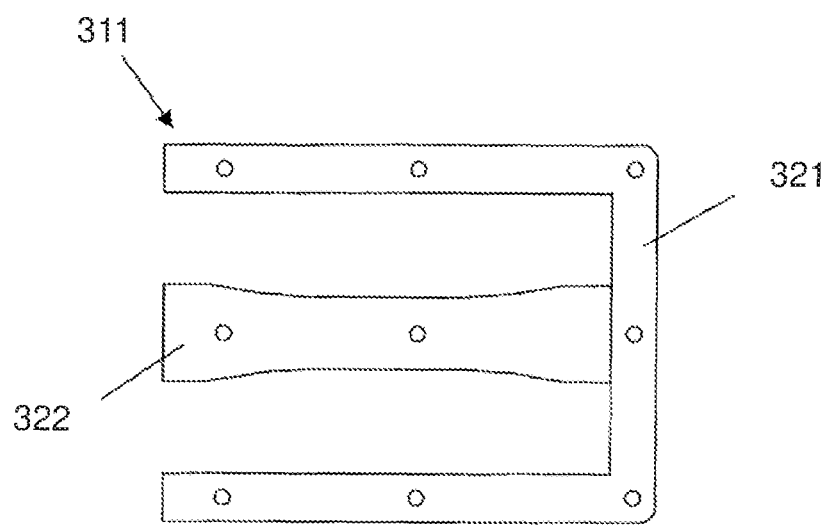
FIG. 13C is a plan view showing the configuration of a yoke formed by stacking the yoke members in FIGS. 13A and 13B.

The yoke 311 is configured such that the flat plate-shaped substantially U-shaped yoke member (fifth yoke) 311a shown in FIG. 13A and the flat plate-shaped substantially E-shaped yoke member (fourth yoke) 311b shown in FIG. 13B are stacked, so that the overall shape is substantially E-shaped as shown in FIG. 13C.

Figure 14:
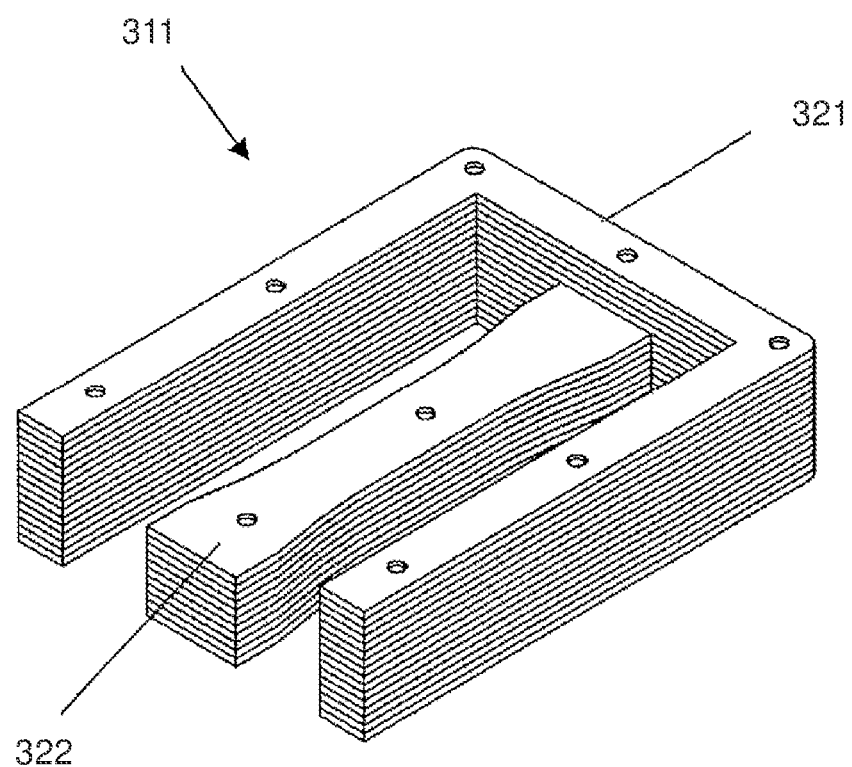
FIG. 14 is an oblique view showing the configuration of a yoke included in the lens drive unit of FIG. 12A.

More specifically, with the lens drive unit 300 of this embodiment, as shown in FIG. 14, 12 of the flat plate-shaped substantially E-shaped yoke members (fourth yokes) 311b shown in FIG. 13B are formed at the bottom, and five of the flat plate-shaped substantially U-shaped yoke members (fifth yokes) 311a shown in FIG. 13A are stacked on the upper surface of the yoke member 311b. In a state of being assembled into the second and third lens group unit 104, as shown in FIG. 12B, etc., the yoke 311 is used such that the state in FIG. 14 is turned upside down.

The convex portion in the center of the substantially E-shaped yoke member 311b is used as the portion of the yoke 311 that serves as the center yoke portion 322.

Consequently, the center yoke portion 322 is disposed at a position that is offset upward in the drawing with respect to the other portions of the yoke 311. Therefore, just as with the configuration of Embodiment 1, the center of the coil 310 is disposed at a position that is offset from the center of the two permanent magnets 315a and 315b.

Here, as shown in FIG. 12A, etc., the center yoke portion 322 is formed such that the width Wc decreases from the ends toward the vicinity of the middle part in plan view.

Figure 12B:
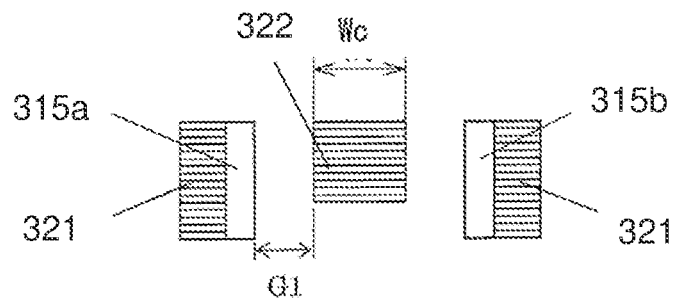
FIG. 12B is a cross-sectional view along the C-C line in FIG. 12A.
Figure 12C:
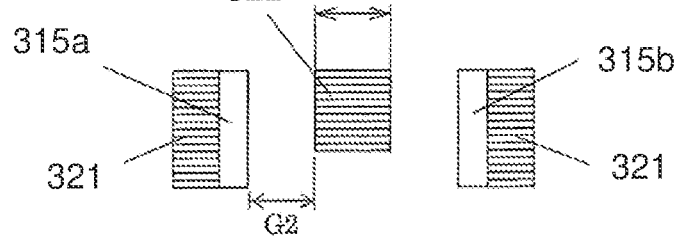
FIG. 12C is a cross-sectional view along the B-B line in FIG. 12A.
Figure 12D:
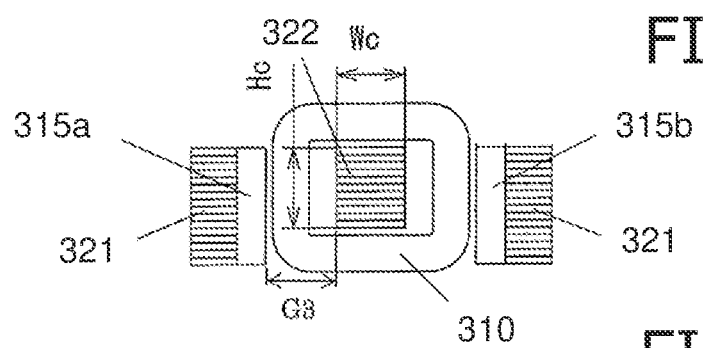
FIG. 12D is a cross-sectional view along the A-A line in FIG. 12A.

Consequently, as shown in FIGS. 12B to 12D, the width Wc of the center yoke portion 322 gradually decreases from the end toward the vicinity of the middle part, while the height Hc remains constant.

Therefore, the gap between the permanent magnets 315a and 315b and the surface of the center yoke portion 322 opposite the permanent magnets 315a and 315b is as shown in FIGS. 5B, 5C, and 5D, in increasing order.

That is, since the shape of the center yoke portion 322 tapers from the ends toward the vicinity of the middle part, the gaps G1, G2, and G3 between the opposing surfaces of the center yoke portion 322 and the permanent magnets 315a and 315b satisfies the following relational expression (1).

$$G1 < G2 < G3 \qquad (1)$$

Consequently, the gap between the center yoke portion 322 and the permanent magnets 315a and 315b is wide near the middle part and tapers toward both ends, so just as in Embodiment 1, the influence of the decrease in the effective magnetic flux density near the ends of the center yoke portion 322 can be cancelled out, the decrease in thrust can be kept to a minimum, and the size of the lens drive unit 300 in the drive direction can be reduced.

When the yoke 311 is formed by stacking the flat yoke members 311a and 311b as described above, a yoke 311 having a complicated shape can be continuously produced very accurately.

Also, increasing the number of yoke members to be stacked is a useful effect because it allows an actuator having a larger thrust to be produced, etc., and flexibly produce various shapes with a single mold.

Other Embodiments

Embodiments of the present disclosure were described above, but the present disclosure is not limited to or by the above embodiments, and various modifications are possible without departing from the gist of the disclosure.

(A)

In Embodiment 1, an example was given of the lens drive unit 10 including the yoke 211 configured by combining two substantially U-shaped yoke members 221 and 222, but the present disclosure is not limited to this.

For example, the lens drive unit disclosed herein may have a configuration including a yoke produced by combining a substantially U-shaped yoke member and a substantially I-shaped center yoke portion.

(B)

In Embodiment 1, as shown in FIGS. 8A and 8B, an example was given of using the yoke 211 in which the recessed portions of the center yoke portions 221a and 222a were formed in vertical symmetry, but the present disclosure is not limited to this.

For example, a yoke in which the recessed portions of the center yoke portion are in vertical asymmetry may be used.

(C)

In Embodiment 2 above, as shown in FIG. 14, 11 of the flat plate-shaped substantially E-shaped yoke members (fourth yokes) 311b shown in FIG. 13B were at the bottom, and the flat plate-shaped substantially U-shaped yoke member 311a shown in FIG. 13A was stacked over the upper surface of these 11 yoke members 311b to produce the lens drive unit 300, but the present disclosure is not limited to this.

For example, the lens drive unit disclosed herein does not have to be configured by stacking flat plate-shaped substantially E-shaped and substantially U-shaped yoke members, and as in Embodiment 1, two substantially U-shaped yoke members may be combined, or a substantially U-shaped yoke member and a substantially I-shaped center yoke portion may be combined.

(D)

In Embodiment 1, an example was given in which two substantially U-shaped yoke members 221 and 222 were formed by bending the sheet metal-shaped yoke members 221 and 222 in the same direction at two places, namely, the bent portions x1 and x2, but the present disclosure is not limited to this.

For example, the substantially U-shaped yoke member is not limited to a configuration in which a sheet metal-shaped member is bent to form an approximate U shape, and an approximate U shape may be formed by other working, or a substantially U-shaped member may be used right from the time of molding.

(E)

In the above embodiments, examples were given in which the present disclosure was realized as a lens drive unit installed in a lens barrel, but the present disclosure is not limited to this. For example, the present disclosure may be realized as a linear actuator that drives an optical component mounted on a magnetic disk device or the like.

INDUSTRIAL APPLICABILITY

The lens drive unit disclosed herein has the effect of allowing a lens to be driven by obtaining the required thrust up to the end of the lens drive range, while reducing the size of the unit, and therefore can be broadly applied as an actuator for driving a lens.

The invention claimed is:

1. A lens drive unit that drives a lens back and forth in the optical axis direction, the unit comprising:
   two permanent magnets that are spaced apart and substantially parallel, with same poles facing each other;
   a yoke having center yoke portions provided in a space where the two permanent magnets are facing each other, a back yoke portion provided at a position in contact with a surface on an opposite side from the facing poles of the permanent magnets, and a connect yoke portion that magnetically joins the center yoke portions and the back yoke portion; and
   a coil that is wound so as to surround a part of the center yoke portions,
   a height of a surface of the center yoke portions facing the permanent magnets in a direction parallel the permanent magnets and orthogonal to the optical axis direction is such that a height near a middle part in the optical axis direction is smaller than a height near two ends in the optical axis direction.

2. The lens drive unit according to claim 1,
wherein the coil is provided at a position where a center of a winding around the center yoke portions is offset from a center of the two permanent magnets to an outer peripheral side with respect to a center of the optical axis of the lens.

3. The lens drive unit according to claim 1,
wherein the yoke is made up of a combination of a first yoke and a second yoke that are substantially U-shaped, and a third yoke having a flat plate shape.

4. The lens drive unit according to claim 1,
wherein the yoke is configured such that a first yoke having a substantially E-shaped flat plate shape is stacked with a second yoke having a substantially U-shaped flat plate shape.

5. A lens barrel, comprising:
the lens drive unit according to claim 1; and
a lens frame that holds the lens and is driven back and forth in the optical axis direction, together with the lens, by the lens drive unit.

6. A lens drive unit that drives a lens back and forth in the optical axis direction, the unit comprising:
two permanent magnets that are spaced apart and substantially parallel, with same poles facing each other;
a yoke having center yoke portions provided in a space where the two permanent magnets are facing each other, a back yoke portion provided at a position in contact with a surface on an opposite side from the facing poles of the permanent magnets, and a connect yoke portion that magnetically joins the center yoke portions and the back yoke portion; and
a coil that is wound so as to surround a part of the center yoke portions,
a gap between an opposing surfaces of the center yoke portions and the permanent magnets is such that a gap near a middle part in the optical axis direction is larger than a gap near two ends in the optical axis direction, and
wherein the coil is provided at a position where a center of a winding around the center yoke portions is offset from a center of the two permanent magnets to an outer peripheral side with respect to a center of the optical axis of the lens.

7. The lens drive unit according to claim 6,
wherein the yoke is made up of a combination of a first yoke and a second yoke that are substantially U-shaped, and a third yoke having a flat plate shape.

8. A lens barrel, comprising:
the lens drive unit according to claim 6; and
a lens frame that holds the lens and is driven back and forth in the optical axis direction, together with the lens, by the lens drive unit.

9. A lens drive unit that drives a lens back and forth in the optical axis direction, the unit comprising:
two permanent magnets that are spaced apart and substantially parallel, with same poles facing each other;
a yoke having center yoke portions provided in a space where the two permanent magnets are facing each other, a back yoke portion provided at a position in contact with a surface on an opposite side from the facing poles of the permanent magnets, and a connect yoke portion that magnetically joins the center yoke portions and the back yoke portion; and
a coil that is wound so as to surround a part of the center yoke portions,
a gap between an opposing surfaces of the center yoke portions and the permanent magnets is such that a gap near a middle part in the optical axis direction is larger than a gap near two ends in the optical axis direction, and
wherein the yoke is configured such that a first yoke having a substantially E-shaped flat plate shape is stacked with a second yoke having a substantially U-shaped flat plate shape.

* * * * *